US007448284B2

(12) United States Patent
Hsieh

(10) Patent No.: US 7,448,284 B2

(45) Date of Patent: Nov. 11, 2008

(54) SPANNER WITH STRAIN ALARM FUNCTION

(76) Inventor: Chih-Ching Hsieh, 235 Chung - Ho Box 8-24, Taipei (TW)

(*) Notice: Subject to any disclaimer, the term of this patent is extended or adjusted under 35 U.S.C. 154(b) by 92 days.

(21) Appl. No.: 11/438,733

(22) Filed: May 23, 2006

(65) Prior Publication Data

US 2007/0272035 A1 Nov. 29, 2007

(51) Int. Cl.
*G01L 5/24* (2006.01)

(52) U.S. Cl. ............... 73/862.21; 73/862.23; 73/862.26

(58) Field of Classification Search .............. 73/862.21, 73/862.23, 862.26

See application file for complete search history.

(56) References Cited

U.S. PATENT DOCUMENTS

| | | | | | |
|---|---|---|---|---|---|
| 4,535,659 | A | * | 8/1985 | Yang | 81/478 |
| 4,864,841 | A | * | 9/1989 | Heyraud | 73/862.21 |
| 4,958,541 | A | * | 9/1990 | Annis et al. | 81/479 |
| 4,982,612 | A | * | 1/1991 | Rittmann | 73/862.23 |
| 6,070,506 | A | * | 6/2000 | Becker | 81/479 |
| 6,784,799 | B2 | * | 8/2004 | Hsien | 340/668 |
| 6,940,417 | B2 | * | 9/2005 | Hsien | 340/668 |
| 6,968,759 | B2 | * | 11/2005 | Becker et al. | 81/479 |
| 2002/0178873 | A1 | * | 12/2002 | Hsieh | 81/125.1 |
| 2003/0094081 | A1 | * | 5/2003 | Becker et al. | 81/479 |
| 2004/0261542 | A1 | * | 12/2004 | Hsien | 73/862.21 |

* cited by examiner

*Primary Examiner*—Edward Lefkowitz
*Assistant Examiner*—Freddie Kirkland, III
(74) *Attorney, Agent, or Firm*—Troxell Law Office PLLC

(57) ABSTRACT

A spanner with a strain alarm function comprises a spanner body having at least one driving head at one end thereof; a strain gauge installed at the spanner body; a display installed in the spanner body electrically connected to the strain gauge; an alarm unit installed in the display; when a spanner body drives an object to be tightened and a twisting force applied to the object has achieved to a predetermined value, the alarm will emit alert signal to users so as to inform the user that the object to be tightened has achieved to a predetermined position. The alarm unit is one of a light emitting body and a buzzer. The predetermined value is a summation of a desired value for tightening the object and an added value under the consideration of a retuning level of the object as the spanner is released from the object.

1 Claim, 3 Drawing Sheets

SPANNER WITH STRAIN ALARM FUNCTION

FIELD OF THE INVENTION

The present invention relates to spanners, and in particular to a spanner with a strain alarm function, wherein when a spanner body drives an object to be tightened and a twisting force applied to the object has achieved to a predetermined value, then an alarm unit will emit alert signal to users. The predetermined value is a summation of a desired value for tightening the object and an added value under the consideration of a retuning level of the object as the spanner is released from the object.

BACKGROUND OF THE INVENTION

Spanners are general used hand tools. To have higher precision in driving an object, strain gauges and displays are added to the spanner so as to show the driving forces of the spanners.

Generally, the strain gauge is installed at a weakest area of the spanner so that the bridge circuit will lose of balance and thus the strain gauge can be measured precisely. When the applied twisting force has over a predetermined value set in the strain gauge, alarm voices will emit so as to inform the user that the operation has achieved to a desired one.

However from the experience, it is known when the object to be driven has achieved to a desired value and then the spanner is released from the object, then the object will rotate back a little so that in fact, the object is not at a desired driving angle. That is, the object is not at a tighten position which is predetermined set. However this will induce some danger in many mechanic devices, such as airplane, boats, etc.

SUMMARY OF THE INVENTION

Accordingly, the primary object of the present invention is to provide a spanner with a strain alarm function, wherein when a spanner body drives an object to be tightened and a twisting force applied to the object has achieved to a predetermined value, then the alarm will emit alert signal to users. The predetermined value is a summation of a desired value for tightening the object and an added value under the consideration of a retuning level of the object as the spanner is released from the object.

To achieve above objects, the present invention provides a spanner with a strain alarm function which comprises a spanner body having at least one driving head at one end thereof; a strain gauge installed at the spanner body; a display installed in the spanner body electrically connected to the strain gauge; an alarm unit installed in the display; when a spanner body drives an object to be tightened and a twisting force applied to the object has achieves to a predetermined value, the alarm will emit alert signal to users so as to inform the user that the object to be tightened has achieved to a predetermined position. The alarm unit is one of a light emitting body and a buzzer. The predetermined value is a summation of a desired value for tightening the object and an added value under the consideration of a retuning level of the object as the spanner is released from the object.

When the object to be tightened is metal, then the object will be driven to an angle with 5 degrees over a predetermined angle. When the object to be tightened is a plastic material, then the object will be further driven to an angle which has 15 degrees over a predetermined angle.

The various objects and advantages of the present invention will be more readily understood from the following detailed description when read in conjunction with the appended drawing.

DETAILED DESCRIPTION OF THE INVENTION

Figure 1:
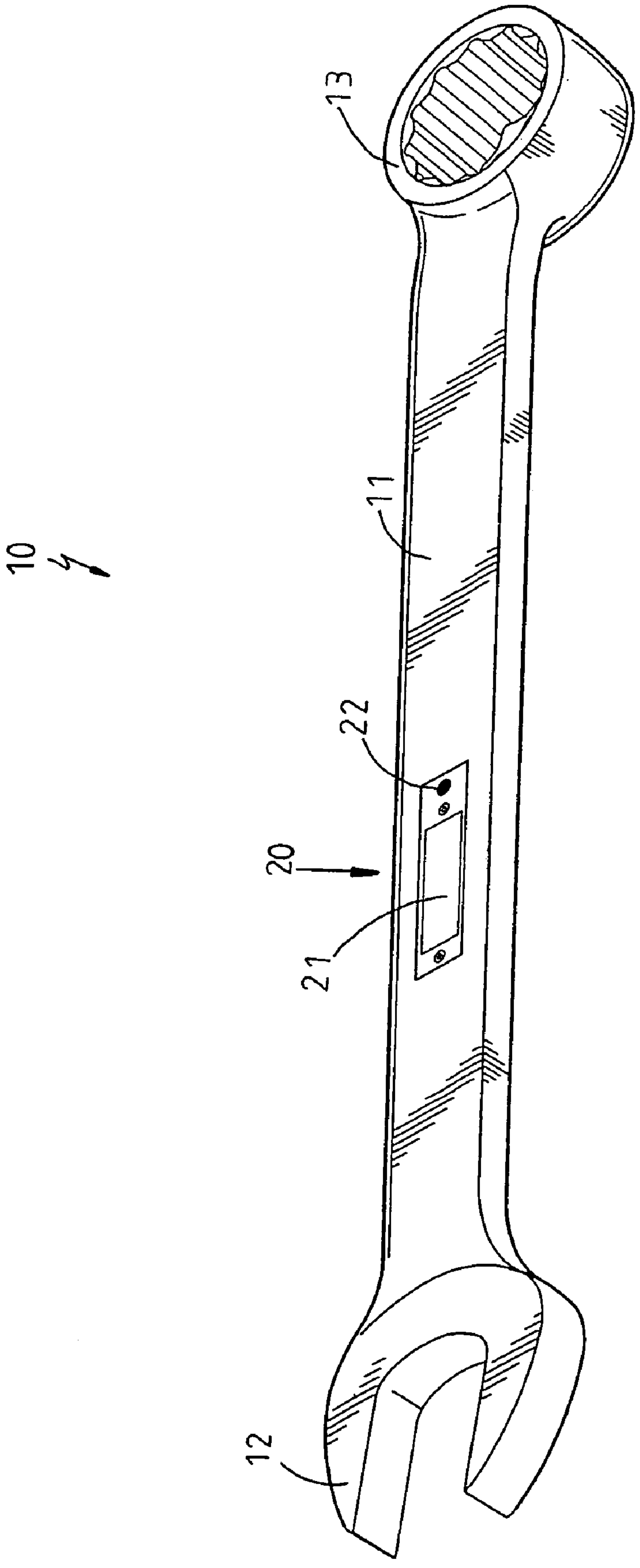
FIG. 1 is a perspective view of the spanner body.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 7, the present invention is illustrated. In the following described, a spanner with an opened driving head and a ring driving head is used as an example, however this is no used to confine the scope of the present invention. The present invention has the following elements.

A long holding portion 11 has a predetermined length. One end of the holding portion 11 is extended with an opened driving head 12 with a clamping arms. Another end thereof is extended with a ring driving head 13 with inner teeth in the ring. A strain gauge is embedded into (or adhered on) the spanner body 10. It is preferably the portion for attaching the strain gauge is a weakest portion of the spanner body 10.

A display 20 is installed to a predetermined position of the spanner body 10. A sensor (not shown) installed in a recess of the holding portion 11 is connected to a strain gauge. The display 20 has a display unit 21 which serves to convert the signal of the sensor into digital signals. The display 20 further has an alarm unit 22 which may be a buzzer or a light emitting element. In the drawing, the alarm unit 22 is a light emitting element, however in use, the light emitting element may be combined with a buzzer.

Figure 2:
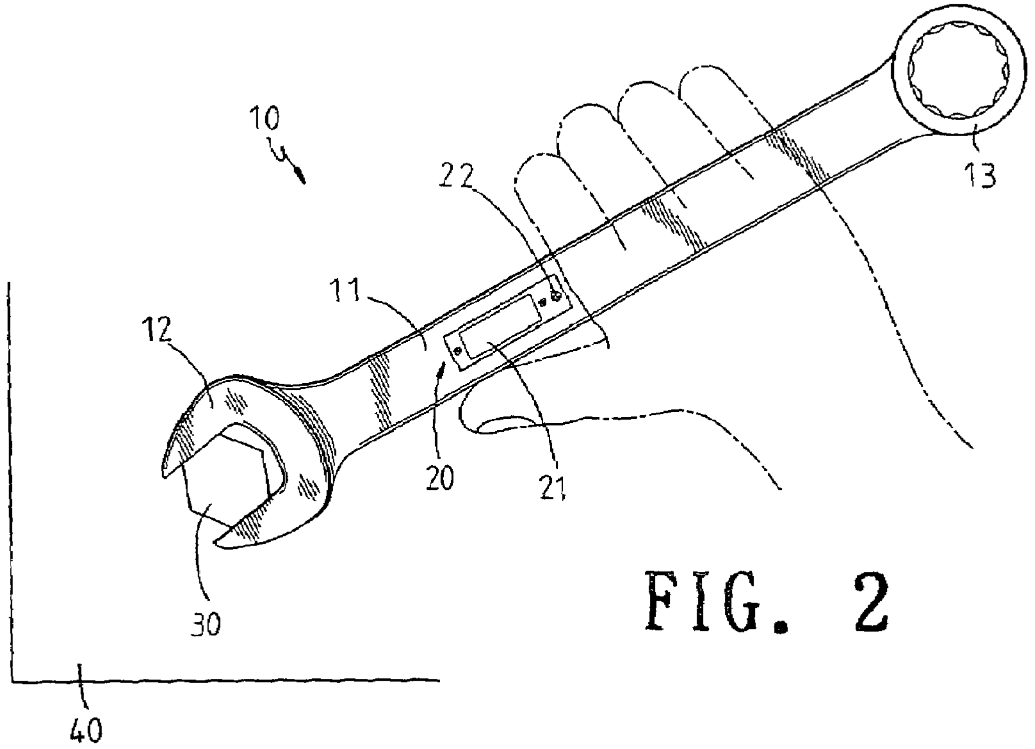
FIG. 2 is a plane schematic view about the spanner body of the present invention.
Figure 3:
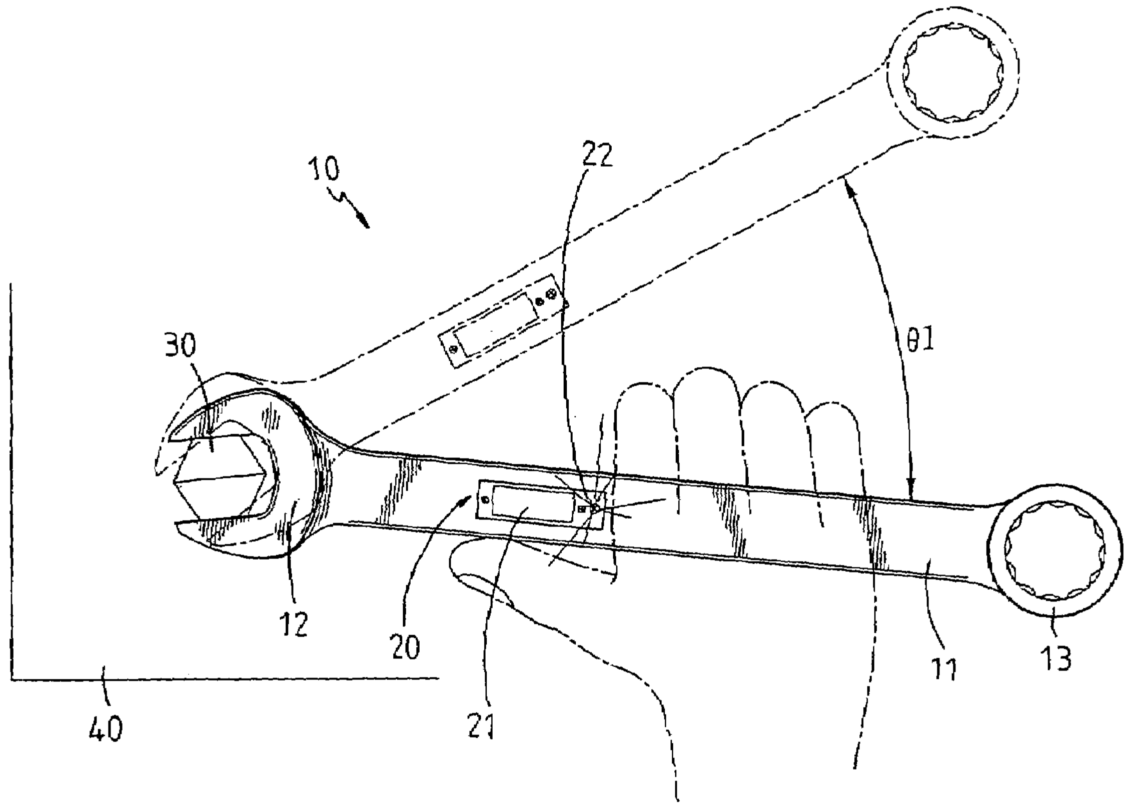
FIG. 3 is a schematic view showing that the present invention is rotated to a predetermined angle $\theta$1.
Figure 4:
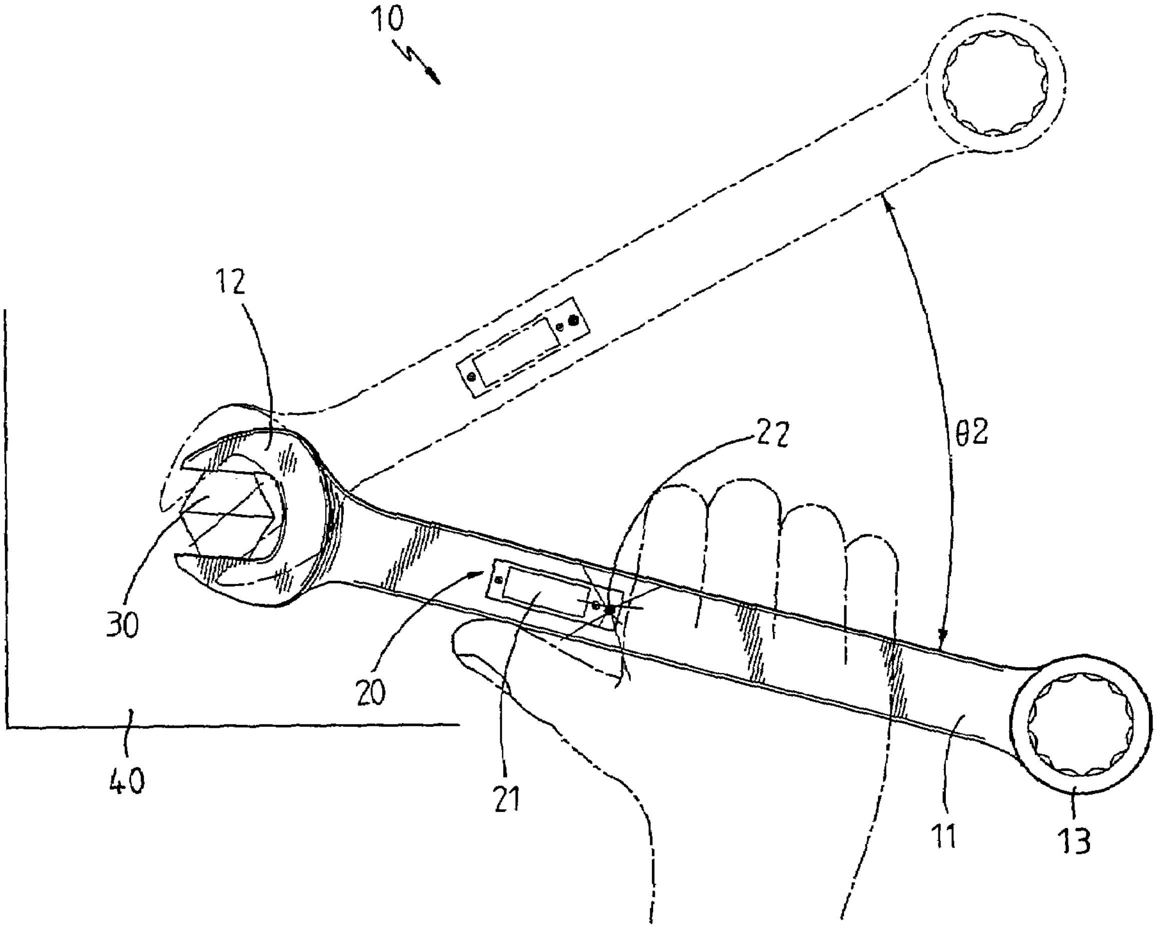
FIG. 4 is a schematic view showing that a driving object is rotated through a further angle of $\theta$2.

Referring to FIGS. 2 to 4, when the spanner body 10 drive a tightening unit 30 to a predetermined angle $\theta$1 (referring to FIG. 3). It has attained a twisting value of a strain gauge. Then the user applies a force to the tightening unit 30 through a rotation angle of 5 to 15 degrees according to the material of the object 40 to be tightened. Thereby the spanner body 10 moves to the angle $\theta$2 illustrated in FIG. 4. Then the alarm unit 22 will emit red light or emit sound to assure that the tightening unit 30 has been locked to an optimum position.

The material of the object 40 to be tightened may be divided into non-deformed metal material and elastic plastic material, moreover, it is necessary to determine whether the object 40 to be tightened is non-flat. If the object 40 to be tightened is metal material, it is only necessary to rotate through 5 degrees. If the material is plastic, or the object 40 to be tightened is non-flat, the rotation angle is 15 degrees. Thus, the object 40 to be tightened can return to the angle of $\theta$1 so as to have a high precision.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A spanner with a strain alarm function comprising:

a long holding portion;

one end of the holding portion being extended with an opened driving head having clamping arms; another end thereof being extended with a ring driving head having inner teeth in the ring;

a strain gauge embedded into or adhered on the spanner body at a weakest portion of the spanner body;

a display being installed to a predetermined position of the spanner body; a sensor installed in a recess of the holding portion being connected to a strain gauge; the display having a display unit which serves to convert the signal of the sensor into digital signals;

an alarm unit installed in the display; the alarm unit being the combination of light emitting elements and a buzzer;

wherein when a spanner body drives an object to be tightened and a twisting force applied to the object has achieved to a predetermined value, then the alarm unit will emit an alert signal to users so as to inform the user that the object to be tightened has achieved to a predetermined position; and wherein the predetermined value is a summation of a value for tightening the object and an added value under a consideration of a retuning level of the object as the spanner is released from the object;

wherein when the object to be tightened is metal, then the added value is 5 degrees, that is, the object will be driven to an angle with 5 degrees over an angle for tightening the object; or wherein when the object to be tightened is a plastic material, then the added value is 15 degrees, that is, the object will be driven to an angle with 15 degrees over an angle for tightening the object.

* * * * *